United States Patent Office.

CHARLES STICHT, OF PARIS, FRANCE.

*Letters Patent No. 62,507, dated February 26, 1867.*

IMITATION OF PEARL ON SOLID SUBSTANCES.

*The Schedule referred to in these Letters Patent and making part of the same.*

TO ALL WHOM IT MAY CONCERN:

Be it known that I, CHARLES STICHT, of Paris, in the department de la Seine, France, have invented certain improvements in Imitation of the Mother of Pearl on the Surfaces of Solid Bodies, for which invention I obtained Letters Patent in France, on the fourteenth day of May, 1866; and I hereby declare the following to be a full and exact description thereof.

The object of my invention is the imitation of the surfaces of the mother of pearl on solid bodies, principally on paper, wood, leather, ground plaster, etc. This idea arises from the eatable oyster, (*Ostrea edulis*,) and from the pearl oyster, (*Margaritifera pintadina*.) All induces me to believe that the colors that the mother of pearl presents are not always a simple effect of interference results from the structure of its surface, but very often a deposit of the metals that the sea water contains in dissolution, (silver, iron, and lead,) which on account of their extreme tenuity may have escaped till now all analysis. Indeed, a mixture of calcareous matter and fish glue, or of platine, or of salts dissolved in water, or in their water of crystallization, and applied in a thin bed or coat on any surface whatever, fit for it, gives in a bath of sulphuric acid the structure of the mother of pearl with the colors of the prism, which may be modified by the co-operation of a current of bromohydric acid, etc.

Without the assistance of the gases one may obtain in the open air surfaces of white mother of pearl or spotted by transparency by means of a ground of color. The structure of the surfaces of mother of pearl may be regulated when the first of the disposition of the particles, appears, so that one may obtain the most varied forms. For that purpose one applies for the moment points, frames, or typographical boards disposed for that purpose. One may employ one or several salts mixed in variable proportions without the addition of any ingredients but gelatinous or resinous substances. I, by preference, employ acetates or sulphates. It is well understood that the choice of the gelatinous or resinous materials depends upon the acid or salt.

The bed or coat to apply on the surfaces of an object may be obtained with paint brushes, wooden knives, folders' rolls, or by a warm or cold immersion. I obtain very fine effects on plastic objects on account of the diversity of reflection of the light. I can use the sulphates, but, above all, prefer the acetates. After having tried the greater part of saline solutions I chose acetate of lead without any other additional substance, but gelatin. I have more particularly chosen this salt on account of its great power of crystallization. It is besides absolutely impossible to obtain anything worth while to be considered with weak solutions and at bad temperatures. I obtain, on the contrary, an astonishing result on paper, wood, cloth, etc., in the following manner:

One hundred and twenty-five parts of the acetate of lead of commerce dissolved hot in its weight of water, mixed with eight parts of gelatin dissolved in warm water of a sirupy consistence. These proportions may be more or less. This mixture maintained in a porcelain vase at the heat of 100° centigrade, and applied in thin beds or vats by means of a painting brush of the breadth of the surface to cover on paper, wood, cloth, etc., gives in cooling the most surprising results. It is well to warm the objects to be covered superficially from 15° to 50° or even 60° centigrade, and to cool it slowly or suddenly according as one wishes to obtain large or small designs. A current of natural air artificially applied on the surfaces when the crystallization is half done produces the finest effects. One may by means of the typographical moulds already known, modify at pleasure the designs to be formed. The surfaces thus obtained, if one does not wish to preserve them white, may receive the most magnificent colors by submitting them yet damp to currents of gas capable to reduce the salts in metals.

Having now fully described my invention, what I claim as new, and desire to secure by Letters Patent, is as follows:

1. I claim the process herein described for producing surfaces in imitation of mother of pearl on paper and other material.

2. I claim paper or analogous material coated in imitation of mother of pearl, substantially as herein specified.

In testimony whereof I have hereunto set my name in presence of two subscribing witnesses.

CHARLES STICHT.

Witnesses:
   E. BAROT,
   J. HOULET.